United States Patent
Takeuchi

(10) Patent No.: US 6,817,435 B2
(45) Date of Patent: Nov. 16, 2004

(54) HOOD HINGE AND BODY STRUCTURE

(75) Inventor: Akihide Takeuchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,095

(22) Filed: Nov. 7, 2001

(65) Prior Publication Data

US 2002/0053118 A1 May 9, 2002

(30) Foreign Application Priority Data

Nov. 8, 2000 (JP) .................................... P. 2000-340258

(51) Int. Cl.[7] .............................................. B60R 21/34
(52) U.S. Cl. .................... 180/274; 180/69.21; 296/189
(58) Field of Search ............................. 180/69.2, 69.21, 180/274; 16/82, 85; 296/189

(56) References Cited

U.S. PATENT DOCUMENTS

| | | | | |
|---|---|---|---|---|
| 3,909,058 A | * | 9/1975 | Kramer et al. .............. 296/189 |
| 4,012,807 A | * | 3/1977 | Kern ............................ 16/288 |
| 4,015,870 A | * | 4/1977 | Stcherbatcheff et al. ...... 293/32 |
| 4,069,550 A | * | 1/1978 | Silk et al. ..................... 16/361 |
| 4,093,290 A | * | 6/1978 | Pearson ........................ 293/15 |
| 4,186,476 A | * | 2/1980 | Mair et al. .................. 29/407.1 |
| 4,249,632 A | * | 2/1981 | Lucchini et al. ............ 180/274 |
| 4,359,120 A | * | 11/1982 | Schmidt et al. ............ 180/69.2 |
| 4,366,598 A | * | 1/1983 | Harasaki et al. .............. 16/382 |
| 4,727,621 A | * | 3/1988 | Emery et al. ................. 16/239 |
| 4,839,941 A | * | 6/1989 | Orlando ........................ 16/361 |
| 5,557,829 A | * | 9/1996 | Schoen et al. ................ 16/375 |
| 5,934,743 A | * | 8/1999 | Nohr et al. .................. 296/188 |
| 6,237,992 B1 | * | 5/2001 | Howard ....................... 296/194 |
| 6,345,679 B1 | * | 2/2002 | Sasaki ......................... 180/274 |
| 6,371,231 B1 | * | 4/2002 | Nushii et al. ............. 180/69.21 |
| 6,378,640 B1 | * | 4/2002 | Dewey et al. .............. 180/69.2 |
| 6,415,882 B1 | * | 7/2002 | Schuster et al. ......... 180/69.21 |
| 6,439,330 B1 | * | 8/2002 | Paye ........................ 180/69.21 |
| 6,442,801 B1 | * | 9/2002 | Kim ............................. 16/361 |

FOREIGN PATENT DOCUMENTS

| | | |
|---|---|---|
| DE | EP 1 104 728 A2 | 6/2001 |
| FR | EP 0 926 018 A1 | 6/1999 |
| JP | 9-315266 | 12/1997 |
| JP | 10-258773 | 9/1998 |
| JP | 11-291948 | 10/1999 |
| JP | 2000-006845 | 1/2000 |

OTHER PUBLICATIONS

European Search Report dated Mar. 7, 2002.

* cited by examiner

*Primary Examiner*—Brian L. Johnson
*Assistant Examiner*—Bridget Avery
(74) *Attorney, Agent, or Firm*—McGinn & Gibb, PLLC

(57) ABSTRACT

A hood hinge structure for hinge connecting together a hinge lower to be fixed to a body and a hinge upper to be fixed to a hood at a hinge axial center, the engine room side of the vehicle body serving as the fixing portion of the hinge lower is formed as a stepped portion which is situated on the lower side, and the fixing portion of the hinge upper is disposed such that it is opposed to the stepped portion. In this structure, even in case where the head of a pedestrian is butted against the hood in the vicinity of the hinge portion due to a collision, the hinge portion is deformed within a relatively long shock-absorbing stroke formed between the hinge portion and stepped portion formed on the engine room side of the vehicle body to thereby be able to absorb the shock sufficiently.

20 Claims, 9 Drawing Sheets

C-C

C-C

A-A CROSS SECTION

B-B

HOOD HINGE AND BODY STRUCTURE

BACKGROUND OF THE INVENTION

The present invention relates to a hood hinge structure of a vehicle for connecting together a hinge lower which fixed to a vehicle body and a hinge upper which fixed to a hood, and a body structure of a vehicle.

Conventionally, in a vehicle such as a car, as a hood hinge structure comprising hinges connecting a hinge lower fixed to a vehicle body with a hinge upper fixed to a hood, there are employed various kinds of structures. For example, a first conventional structure shown in FIGS. 8A–8C is an ordinary hood hinge structure. As shown in FIG. 8A, FIG. 8B and FIG. 8C, a hinge lower 24 is fixed to a vehicle body (frame upper) 22 extending longitudinally in the right and left side of an engine room, whereas a hinge upper 23 is fixed to a hood inner 21A of a hood (bonnet) 21. These hinge lower 24 and hinge upper 23 are connected together at a hinge axial center H, while the hood 21 can be opened and closed about the hinge axial center H. By the way, reference character 32 designates a front pillar. Reference character 33 designates a front bulkhead. Reference character 34 designates a suspension upper bracket. Reference character 36 designates a frame side upper. Reference character 38 designates a wheel apron lower. Reference character 26 designates a fender panel.

Also, as a second conventional structure, there is shown a structure in FIG. 9, which is disclosed in Japanese Patent Unexamined Publication No. Hei 10-258773. In this structure, an L-shaped support bracket 117, which is held by a fixing bracket 121, is fixed on the upper surface of an upper frame 112 in such a manner that it can drop down. A second hanging portion 128 of a hinge bracket 124 fixed to a hood panel 127 is rotatably connected to a first hanging portion 119 of the support bracket 117. Thus, according to this structure, in the case that a shock is applied to the hood panel 127, the support bracket 117 which is held and fixed between the fixing bracket 121 and the upper frame 112 is deformed and pulled out downwardly by the hinge bracket 124. Therefore, the shock is absorbed effectively due to the deformation of the support bracket 117, thereby being able to minimize damage to a pedestrian.

Further, although not shown or described in detail, as a third conventional structure, there is known a structure disclosed in Japanese Patent Unexamined Publication No. Hei 9-315266. In this structure, when a control unit detects a collision with a pedestrian, the control unit actuates hood-lift-hold means so that a hood is lifted a predetermined amount by an inflator and a rod. Then, the hood is held at the thus lifted position, thereby securing a sufficient deformation stroke with respect to a shock given from the pedestrian.

However, of the above hood hinge structures, in the first conventional structure, as can be clearly shown in FIG. 8C, a clearance between the hinge lower 24 fixed to the upper surface of the frame upper 22 and the hinge upper 23 fixed to the hood inner 21A is narrow, which makes it difficult to mount the hinge lower 24 and hinge upper 23. Also, in the case that such a shock as shown by an arrow P is given to the hood hinge portion due to a collision with a pedestrian, there is a fear that the hinge lower 24 and hinge upper 23 can be butted against each other in a comparatively early stage. Therefore the shock cannot be absorbed sufficiently, thereby increasing damage to the pedestrian.

In view of the above, as in the above-mentioned second conventional structure, there is proposed a structure in which the shock can be absorbed effectively by the deformation of the support bracket 117 so as to be moved and deformed downwardly. However, in this case, there is necessary a predetermined stroke S between the fixing portion of the hinge bracket 124 and the upper surface of the upper frame 112. This increases the height of the hood and thereby causes reducing the freedom of design, low aerodynamic characteristic of the structure and worsening the vehicle handling efficiency by increasing the load of the front portion thereof, and narrows the front field of vision. In addition, after the shock is absorbed, the hinge means including the hinge bracket 124 and support bracket 117 is butted against the upper surface of the upper frame 112, which makes it impossible to absorb the shock any further. Also, in the case of the above-mentioned third conventional structure, in the normal running of the vehicle, since the hood surface is formed low, there is no fear that the aerodynamic characteristic can be lowered and the front field of vision can be narrowed. However, it is necessary to provide detect means for detecting a collision with a pedestrian and a hood lift means, which increases the manufacturing cost of the hinge structure greatly, increases the weight thereof and complicates the structure. That is, the third conventional structure is found not practical.

SUMMARY OF THE INVENTION

The present invention aims at solving the problems found in the above-mentioned conventional hood hinge structure and body structure for a vehicle. Accordingly, it is an object of the invention to provide a hood hinge and body structure for a vehicle, which not only can secure a sufficient shock-absorbing stroke in a hinge portion with a hood surface maintained low but also can enhance the efficiency of the hinge components mounting operation.

In attaining the above object, according to a first aspect of the invention, there is provided a hood hinge and body structure comprising a body having a stepped portion that is located at a position lower than an upper surface of a frame upper of said body and at an engine room side, a hinge lower fixed to a hinge lower fixing portion that is located adjacent to the stepped portion and a hinge upper fixed to a hinge upper fixing portion of a hood and pivotably connected to the hinge lower to form a hinge at a connecting position, wherein the hinge upper fixing portion is opposed to the stepped portion in a vertical direction of the body.

According to a second aspect of the invention, in a vehicle hood hinge structure as set forth in the first aspect of the invention, the invention further comprises a wave portion disposed on a side edge portion of the hood and at least in a vicinity of the hinge upper and being stretchable when an impact acts on the hood.

According to a third aspect of the invention, in a vehicle hood hinge structure as set forth in the first or second aspect of the invention, the invention further comprises a shock-absorbing member interposed between the hinge upper fixing portion and the stepped portion.

According to a fourth aspect of the invention, in a vehicle hood hinge structure as set forth in the third aspect of the invention, the shock-absorbing member is integrally formed with the hinge lower.

According to a fifth aspect of the invention, in a vehicle hood hinge structure as set forth in anyone of the first to fourth aspects of the invention, the invention further comprising a fragile portion formed on the hinge lower between the hinge lower fixing portion and the connecting position.

According to a sixth aspect of the invention, in a vehicle hood hinge structure as set forth in the first aspect of the invention, the stepped portion is located at a range between a strut tower of the body and a bulkhead of the body in a back-and-forth direction of the body and the stepped portion is situated lower than the top surface of a frame upper of the body.

According to a seventh aspect of the invention, in a vehicle body structure as set forth in the sixth aspect of the invention, an upper surface portion of the strut tower is formed lower than the top surface.

According to an eighth aspect of the invention, in a vehicle body structure as set forth in the sixth or seventh aspect of the invention, the invention further comprising an overlapping flange overlapped with both of a front pillar of the body and the strut tower, and mounted on the body.

In these structures, in the case that a shock is given to the hinge portion due to a collision with a pedestrian, because of the existence of the stepped portion which is formed on the engine room side of the vehicle and forms the hinge lower fixing portion, the hinge portion is deformed within a sufficient shock-absorbing stroke to thereby be able to minimize damage to the pedestrian. Moreover, since the hinge portion can be dropped and deformed into the interior of the engine room, there can be provided a further enhanced shock-absorbing function. In addition, due to use of the stepped portion, the hinge components mounting operation can be facilitated.

DETAILED DESCRIPTION OF THE PREFERABLE EMBODIMENT

Figure 1A:
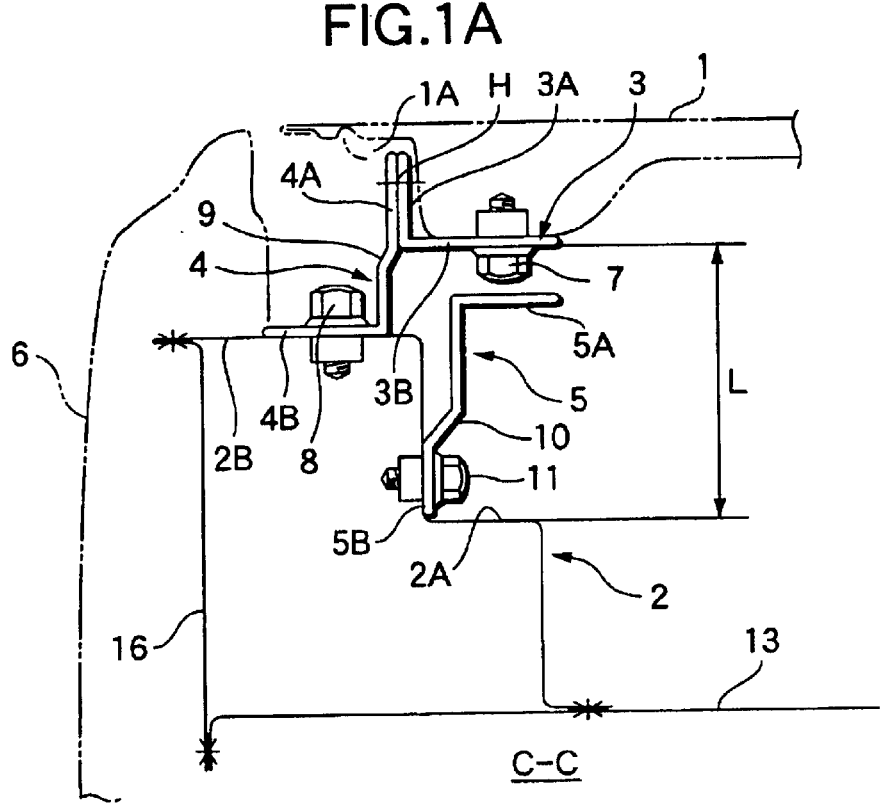
FIG. 1A is a section view of the main portions of the first embodiment of a hood hinge and body structure for a vehicle according to the invention.
Figure 1B:
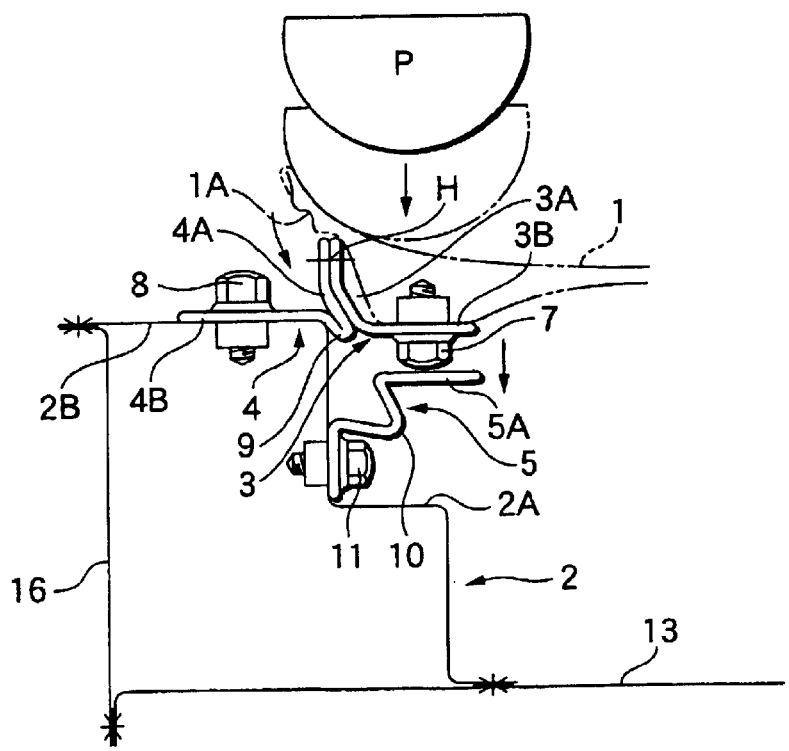
FIG. 1B is a view of the deformed state of the hood hinge structure according to FIG. 1A when absorbing the shock.
Figure 2A:
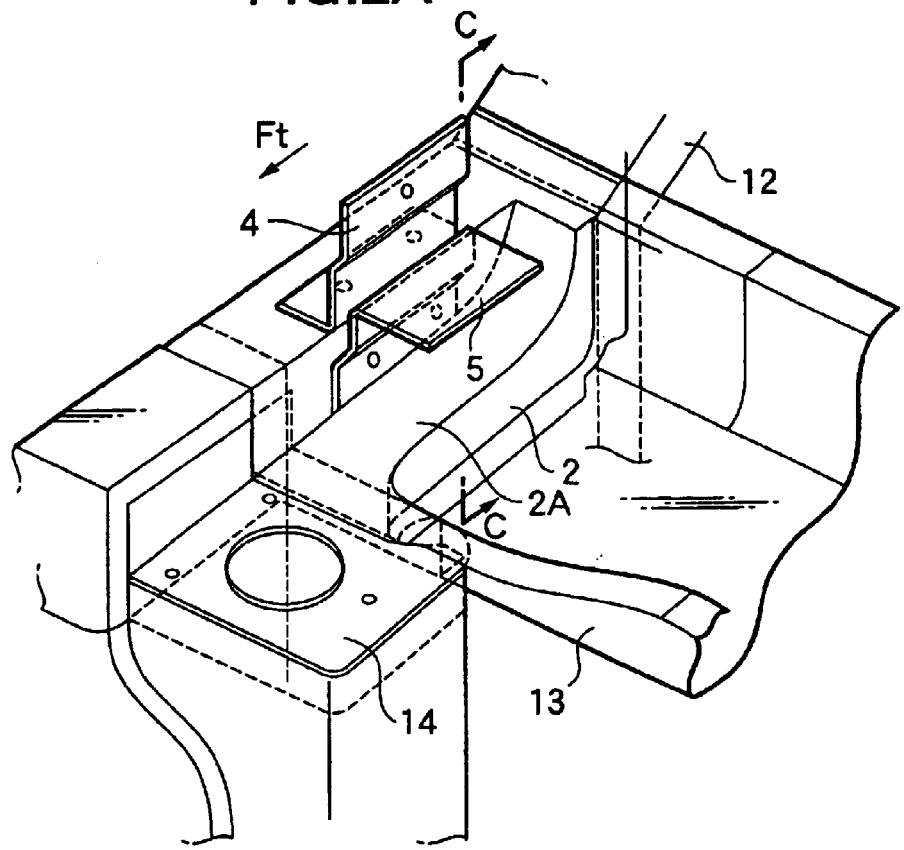
FIG. 2A is a perspective view of the main portions of the first embodiment with the hood side thereof omitted.
Figure 2B:
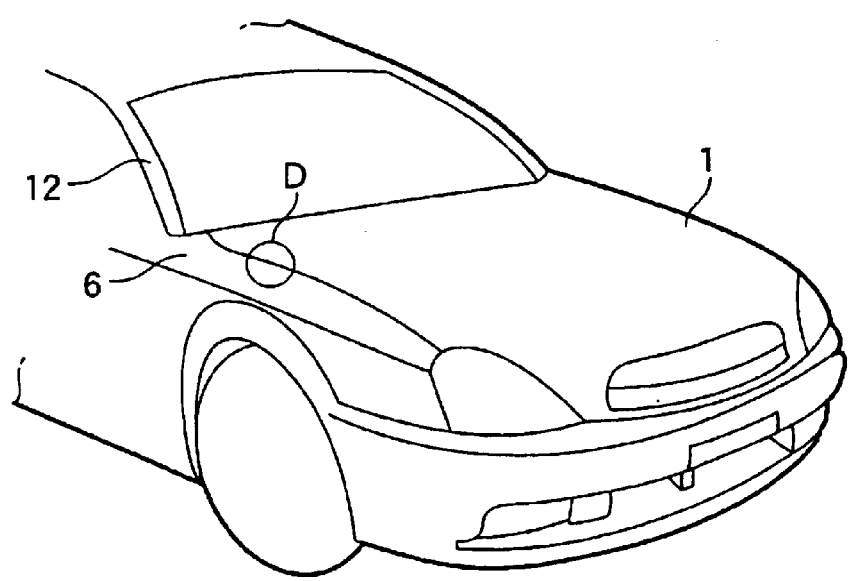
FIG. 2B is a perspective view of the front portion of a vehicle.
Figure 3A:
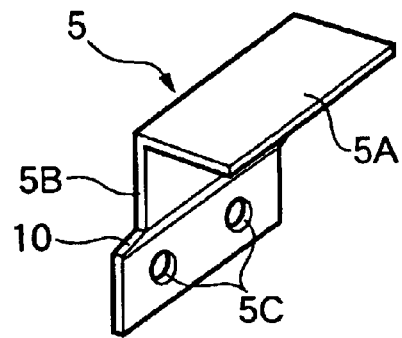
FIGS. 3A–3C are perspective view of modifications of shock-absorbing members employed in the first embodiment.
Figure 3B:
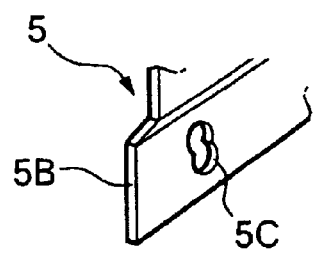
Figure 3C:
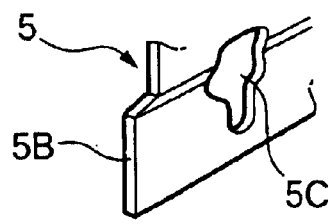

Now, description will be given below of embodiments of a hood hinge and body structure for a vehicle according to the invention with reference to the accompanying drawings. FIGS. 1A to 3C show a first embodiment of the hood hinge and body structure for the vehicle according to the invention. Specifically, FIG. 1A is a section view of the main portions of the first embodiment. FIG. 1B is a view of the deforming state of the first embodiment when a shock is absorbed. FIG. 2A is a perspective view of the main portions of the first embodiment with the hood side thereof omitted. FIG. 2B is a perspective view of the front portion of a vehicle. FIGS. 3A–3C are perspective views of modifications of a shock-absorbing member. The present invention is characterized in that, as shown in FIG. 1A, a hood hinge structure comprises a hinge lower 4 fixed to a vehicle body (frame upper) 2 and a hinge upper 3 fixed to a hood 1, that are connected together by hinge means. The engine room side of the vehicle body 2 served as a hinge lower fixing portion is formed as a stepped portion 2A which is situated on a lower side. In addition, there is disposed a hinge upper fixing portion (the hinge surface 3A of the hinge upper 3) such that it is opposed to the stepped portion 2A.

In more detail, the hood hinge portion according to the invention disposed in a portion designated by reference character D shown in FIG. 2B which is a perspective view of the front portion of a vehicle. According to the illustrated embodiment, a hood, in fact, a bonnet 1 is structured such that the rear end portion thereof is used as a hinge portion and thus the opening end portion of the front portion thereof can be opened and closed. However, this is not limitative but, alternatively, the bonnet 1 can also be structured such that the front end portion thereof is used as a hinge portion and thus the opening end portion of the rear portion thereof can be opened and closed. As FIG. 1A, the frame upper 2 which extends in the back-and-forth direction of the vehicle body and forms the hinge lower fixing portion, and a front bulkhead 13 extending in the width direction of the vehicle body, are fixedly secured to a frame side upper 16 with a fender panel 6 mounted to the outer-most side thereof. In addition, the fixing surface 4B of the L-shaped hinge lower 4 by a fixing bolt 8 is fixed to the upper surface of the frame upper 2, in fact, to the fixing surface 2B of the frame upper 2. On the engine room side of the frame upper 2, the stepped portion 2A that is situated on the lower side is formed. And, the fixing surface 5B of such an L-shaped hinge catcher 5 as shown in FIG. 3A served as a shock-absorbing member is fixed to the stepped portion 2A by a fixing bolt 11, thereby being able to absorb a shock given by the load that is applied from above.

On the other hand, a hinge upper fixing portion is formed in the inner panel of the bonnet (hood 1), and the fixing surface 3B of the L-shaped hinge upper 3 is fixed to the hinge upper fixing portion by a fixing bolt 7. The hinge surface 3A of the hinge upper 3 is connected to the hinge surface 4A of the hinge lower 4 which is disposed so as to be opposed to the hinge surface 3A, at the hinge axial center H by hinge means. The butting surface 5A of the hinge catcher 5 disposed on the stepped portion 2A is situated adjacent to the hinge upper fixing surface 3B forming the hinge upper fixing portion. At least the outside of the hinge upper fixing portion of the side edge portion of the hood is formed as a bending promoting shape portion (wave portion)

1A, whereby the hood 1 can be deformed correspondingly to the shape of a pedestrian, which is applied to the vicinity of the hood hinge portion as an impact object. Also, between the hinge lower fixing portion (the fixing surface 4B of the hinge lower 4) and the connecting portion (hinge axial center H) of the hinge lower 4 and hinge upper 3, there is formed a fragile portion 9 which is formed of, for example, a bent portion. Further, in the intermediate portion of the hinge catcher 5 served as a shock-absorbing member as well, there is formed a fragile portion 10 which is formed of, for example, a bent portion.

As shown in FIGS. 3A–3C, as the shock-absorbing function of the hinge catcher 5, there may be used mounting bolt holes 5C formed in the fixing surface 5B (which is to be mounted to the side surface of the stepped portion 2A) of the hinge catcher 5. As the mounting bolt holes 5C, there can be employed such a potbellied hole having a shock-absorbing function as shown in FIG. 3B. There can be employed such a bolt hole with a slit having a shock-absorbing function as shown in FIG. 3C. Here, FIG. 2A is a perspective view of the main portions, which the hinge portion of the first embodiment of the invention. FIG. 2A is drawn in such a manner that the hood side thereof is omitted. In FIG. 2A, reference character 12 designates a front pillar, while reference character 14 stands for a suspension upper bracket forming the upper surface portion of a strut tower disposed in the suspension of the vehicle. As will be discussed later, the upper surface of the suspension upper bracket 14 is structured so as to be lower than the normal surface of the vehicle body (frame upper) 2 (that is, so as to be substantially flush with the stepped portion 2A).

A hood hinge portion according to the present embodiment is structured in the above-mentioned manner, as shown in FIG. 1B. In the case that the head P of the pedestrian is butted against the hood 1 in the vicinity of the hinge portion due to a collision, the hinge portion is deformed within a relatively long shock-absorbing stroke L that is formed between the hinge upper 3 and stepped portion 2A of the frame upper 2, so as to be able to absorb the shock sufficiently, which makes it possible to minimize damage to the pedestrian. In this case, the side edge portion of the hood 1 is deformed correspondingly to the shape of the head portion P of the pedestrian as an impact object due to the existence of the bending promoting shape 1A formed of a wave portion. Thanks to this, not only a shock surface pressure against the pedestrian is lowered to be able to cushion the shock, but also the deformed side edge portion of the hood 1 is contacted with an upper end portions of the respective hinge surfaces 3A, 4A of the hinge upper 3 and hinge lower 4 to facilitate the generation of bending moment about the hinge axial center H. Therefore, being the curved deformation of the hinge part is promoted.

Further, due to the existence of a fragile portion 9 formed in the hinge surface 4A, the hinge lower 4 can be deformed while absorbing the shock effectively. Then, the hinge upper fixing surface 3B and fixing bolt 7 can be butted against a butting surface 5A of a hinge catcher 5, which is a shock-absorbing member, to thereby effectively deform the hinge catcher 5 including a fragile portion 10 formed in the intermediate portion thereof, so that the shock can be absorbed. According to the invention, since a stepped portion 2A is formed on the engine room side, and the shock-absorbing member is disposed on the stepped portion 2A, which functions as a shock-absorbing portion, the stepped portion 2A not only can facilitate the mounting operation of the hinge member but also has a further shock-absorbing function to absorb the shock that is given by the deformed hinge portion when it drops down into the engine room. Also, in the case that the fragile portion 9 formed in the hinge surface 4A of the hinge lower 4 is curved on the engine room side, not only the vertical length of the hinge surface 4A is reduced and a space for mounting the fixing bolt 7 is increased to be able to enhance the efficiency of the fixing bolt mounting operation, but also such formation of the fragile portion 9 can promote the dropping and deformation of the hinge portion into the engine room to be able to contribute toward expanding the shock-absorbing stroke further.

Figure 4A:
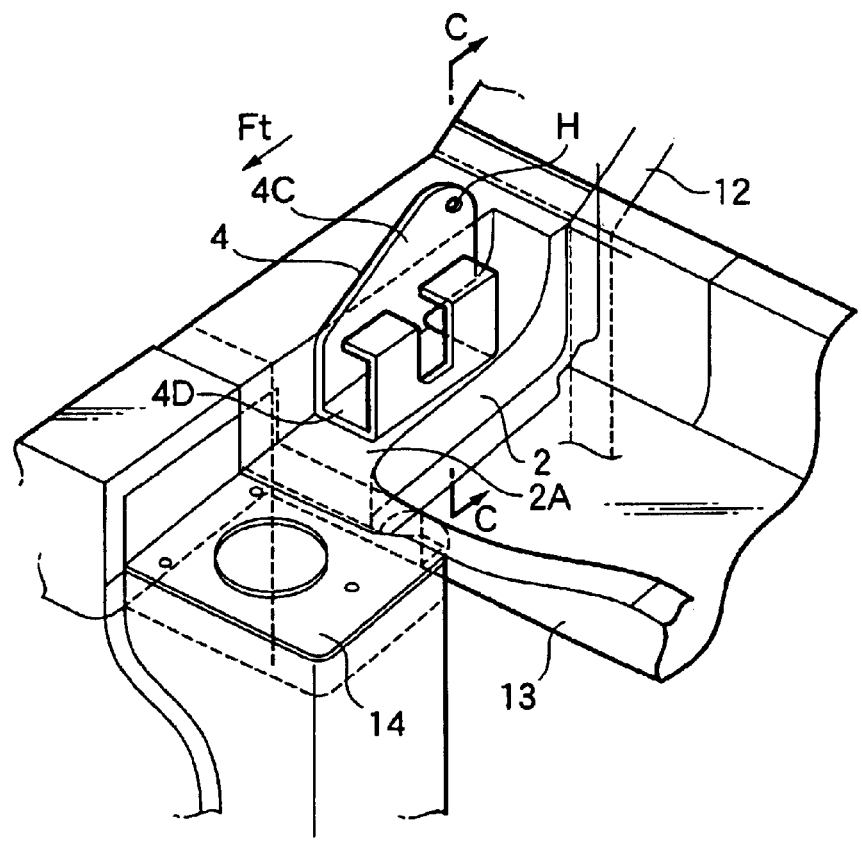
FIG. 4A is a perspective view of the main portions of the second embodiment of a hood hinge and body structure for a vehicle according to the invention, with its hood side omitted.
Figure 4B:
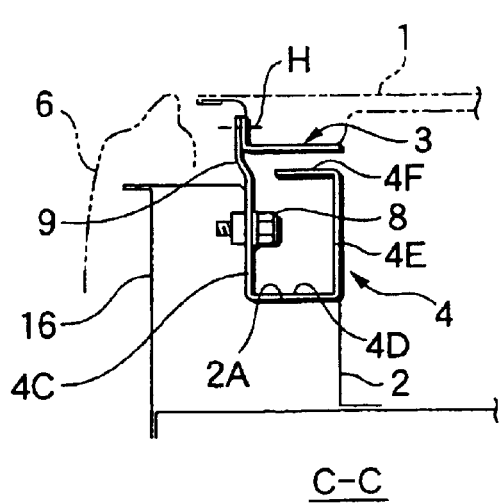
FIG. 4B is a section view of the main portions of the second embodiment according to FIG. 4A.
Figure 4C:
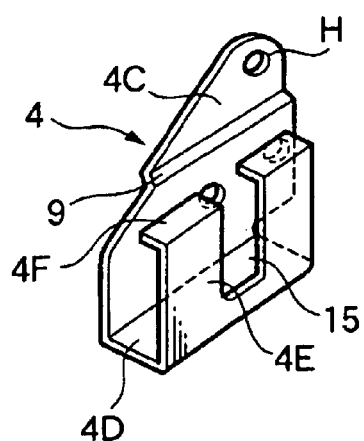
FIG. 4C is a perspective view of a shock-absorbing member employed in the second embodiment according to FIG. 4A.
Figure 5A:
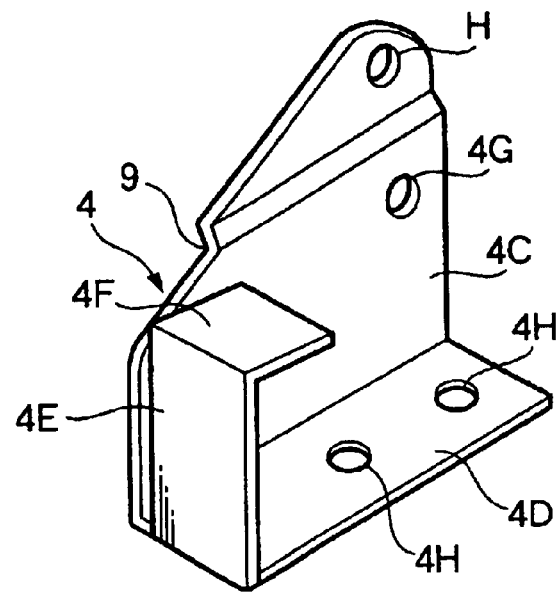
FIGS. 5A and 5B are perspective views of modifications of the above shock-absorbing members.
Figure 5B:
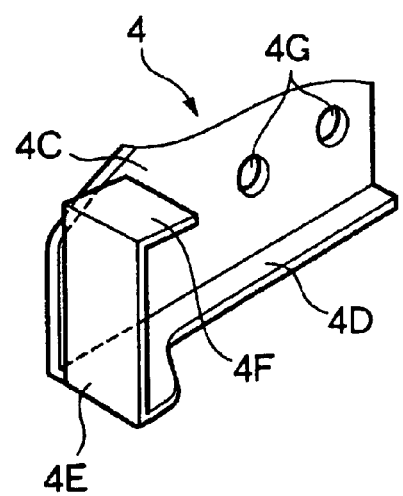

Now, FIGS. 4A–4C and FIGS. 5A–5B respectively show a second embodiment of a vehicle hood hinge structure and a vehicle body structure according to the invention. Specifically, FIG. 4A is a perspective view of the main portions of the second embodiment with its hood side omitted. FIG. 4B is a section view of the main portions of the second embodiment. FIG. 4C is a perspective view of a shock-absorbing member. FIGS. 5A and 5B are perspective views of modification of the above shock-absorbing member. The second embodiment is characterized in that, as shown in FIGS. 4A–4C, the shock-absorbing member (in the case of the previously described first embodiment, the hinge catcher 5) is formed integral with a hinge lower 4. That is, there is employed a substantially 6-shaped hinge lower 4 which is disposed along the side wall to the bottom wall of a stepped portion 2A of a frame upper 2. As shown clearly in FIGS. 4B and 4C, the hinge lower 4 comprises an upright-shaped fixing/hinge surface 4C for fixing the hinge lower 4 to the stepped portion 2A and forming a hinge portion, a hold surface 4D bent at right angles from a lower end portion of the fixing/hinge surface 4C to be held to the bottom wall of the stepped portion 2A, a deforming portion 4E bent up at right angles from the hold surface 4D for forming a shock-absorbing portion, and a butting surface 4F formed by bending the upper end portion of the deforming portion 4E at right angles to be disposed adjacently to and substantially parallel to the fixing portion of the hinge upper 3. The hinge lower 4 is structured such that the fixing/hinge surface 4C can be fixed to the side wall of the stepped portion 2A by a fixing bolt 8 and, at a hinge axial center H disposed in the vicinity of the upper end portion of the fixing/hinge surface 4C, the fixing/hinge surface 4C, in fact, the hinge lower 4 can be connected to the hinge upper 3 by hinge means. By the way, in the deforming portion 4E, there is formed a notch 15 which is used not only to promote the deformation of the deforming portion 4E but also to mount the fixing bolt. Also, reference character 9 designates a fragile portion, which is similar to the fragile portion formed in the first embodiment. The fragile portion 9 shown in FIGS. 4B and 4C is bent outwardly. However, alternatively, the fragile portion 9 maybe bent inwardly so that the hinge member can be deformed easily to the engine room side.

Now, FIGS. 5A and 5B are perspective views of modifications of the shock-absorbing member. Specifically, in the modification shown in FIG. 5A, the deforming portion 4E served as a shock-absorbing portion is formed by raising and bending a front end portion of a hold surface 4D, which is held on and by the bottom wall of the stepped portion 2A. In addition the upper end portion of the deforming portion 4E is bent substantially in the horizontal direction, so as to form a butting surface 4F. In this structure, since the engine room side is open, the fixing operation to fix the fixing/hinge surface 4C to a side wall of a stepped portion 2A through a bolt hole 4G can be facilitated. In this modification, the hold surface 4D can be fixed to the bottom wall of the stepped portion 2A through the bolt holes 4H and, therefore, when the hinge lower 4 is fixed to the stepped portion 2A via fixing bolts, the bolt mounting operation can be facilitated. According to the modification shown in FIG. 5B, according to the shock-absorbing member shown in FIG. 5A, the holding area of the hold surface 4D with respect to the bottom wall of the stepped portion 2A can be minimized, thereby being able to reduce the weight of the shock-absorbing member and simplify the structure thereof.

Thanks to the above-mentioned structure, in the second embodiment, the fixation of the hinge lower side to the vehicle body and the shock-absorbing function can be realized at the same time by a single member, which makes it possible to reduce the number of parts as well as to simplify the parts mounting operations. Also, due to the fixing/hinge surface 4C and hold surface 4D disposed at right angles to the fixing/hinge surface 4C, when the hinge lower 4 is mounted to the stepped portion 2A, the hinge lower 4 can be set positively and easily and the hold surface 4D can be positively held on and by the bottom wall of the stepped portion 2A, which makes it possible to deform the deforming portion 4E when absorbing the shock.

Figure 6:
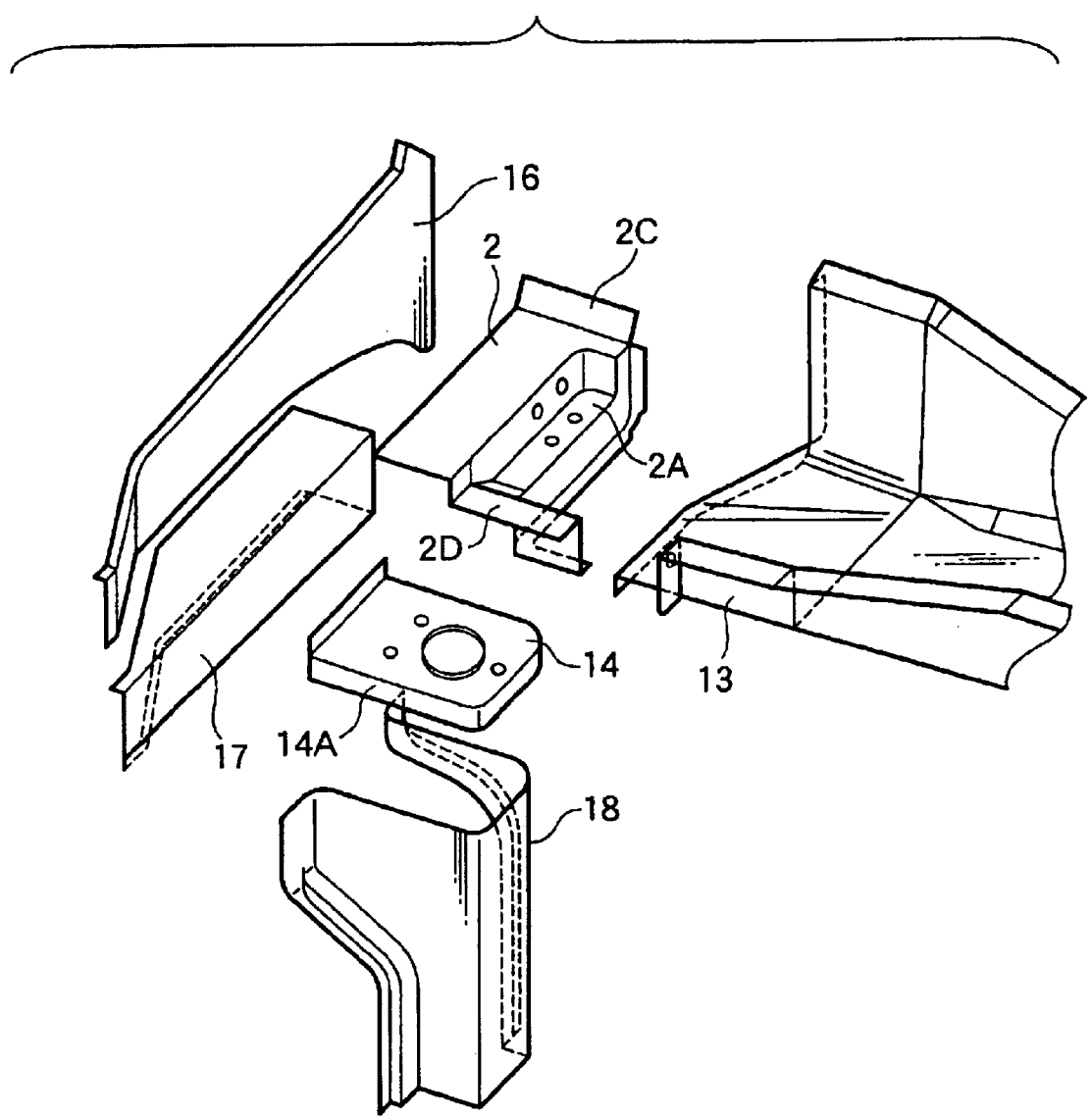
FIG. 6 is an exploded perspective view of the main portions of a first embodiment of a vehicle body structure to which the above-mentioned hood hinge structure according to the invention.

Now, FIG. 6 is an exploded perspective view of the main portions of a first embodiment of a vehicle body structure to which the above-mentioned hood hinge structure according to the invention is applied. In the present embodiment, on the engine room side, which ranges from the strut tower (which is composed of a wheel apron upper 17, a wheel apron lower 18 and a suspension upper bracket 14 for storing a suspension therein) of the vehicle body (a frame upper) 2 to a bulkhead 13, there is disposed a stepped portion 2A which is situated lower than the normal surface (the upper surface of the frame upper 2). From the rear end portion of the frame upper 2, there is extended an overlapping flange 2C which is inclined obliquely upwardly, and the overlapping flange 2C is overlapped with a front pillar 12 (see FIGS. 7A–7C) so that the frame upper 2 and front pillar 12 are continuously connected together. And, an overlapping flange 2D, which is extended from the front end portion of the frame upper 2, is overlapped with the upper surface of the suspension upper bracket 14 so that they are continuously connected together. Thanks to this structure, the vertical input loads from the suspension and the shock given from front due to the collision of the front portion of the vehicle body can be dispersed to the front pillar 12 to enhance a collision shock-absorbing effect, thereby being able to realize sufficient shock absorption. Also, from the upper surface of the suspension upper bracket 14, there hangs an overlapping flange 14A which can be overlapped with the three surfaces of the wheel apron lower 18. Due to the provision of the overlapping flange 14A, the suspension upper bracket 14 can receive loads smoothly through its three shelf surfaces in the longitudinal direction thereof, thereby being able to enhance the suspension rigidity and vehicle body rigidity.

Figure 7A:
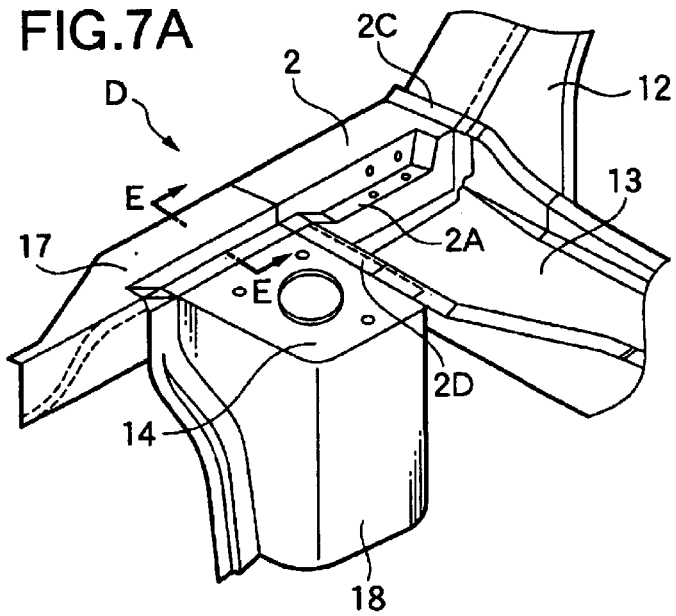
FIG. 7A is a perspective view of the main portions of the second embodiment of a hood hinge and body structure for a vehicle according to the invention after it is assembled.
Figure 7B:
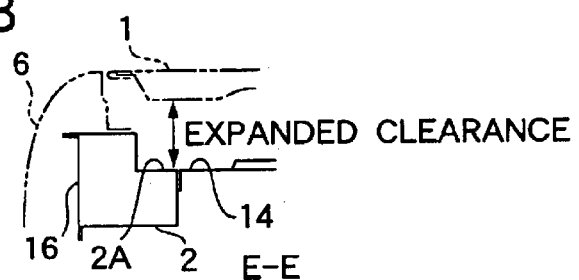
FIG. 7B is a section view taken along the arrow line E—E shown in FIG. 7A.
Figure 7C:
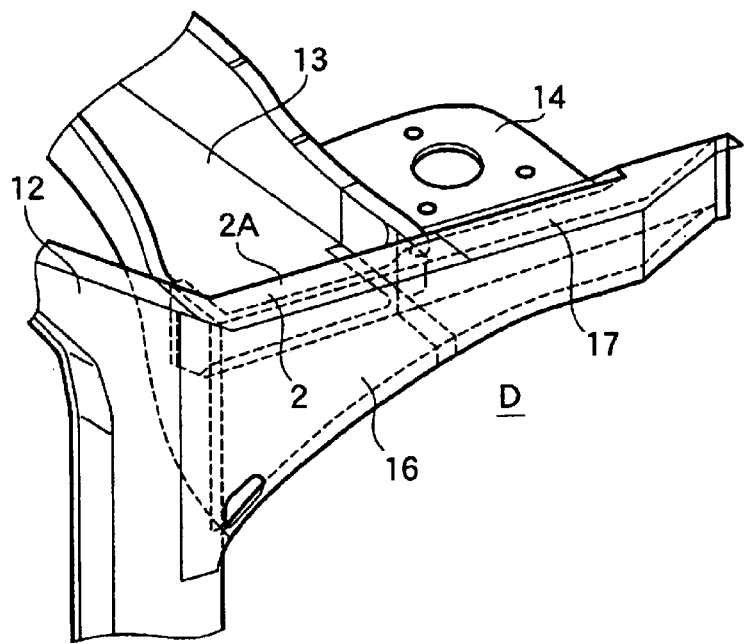
FIG. 7C is an arrow view taken along the arrow mark D shown in FIG. 7A.
Figure 8A:
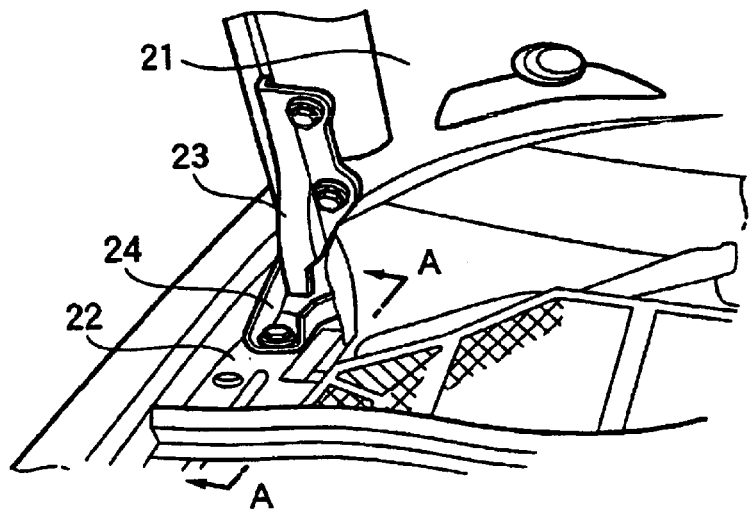
FIGS. 8A–8C are explanatory views of a first conventional hood hinge structure; and, FIG. 9 is an explanatory view of a second conventional hood hinge structure.
Figure 8B:
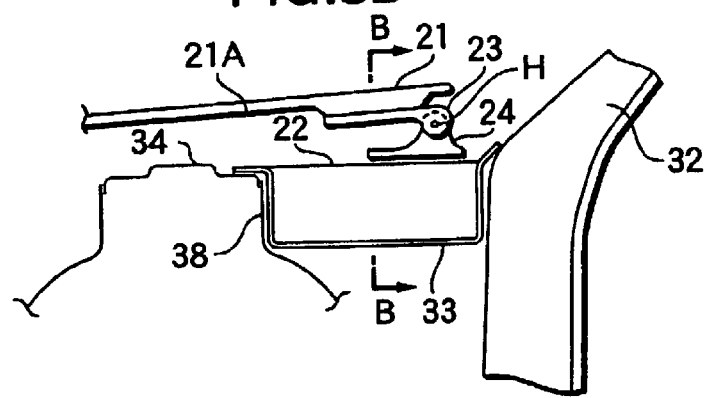
Figure 8C:
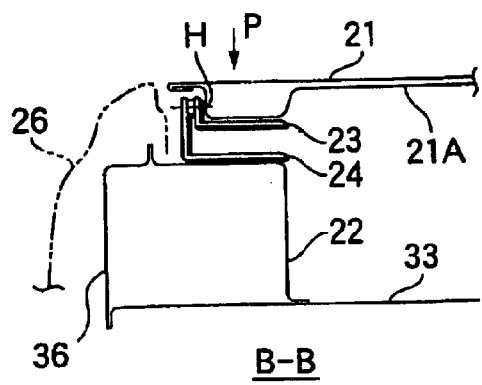
Figure 9:
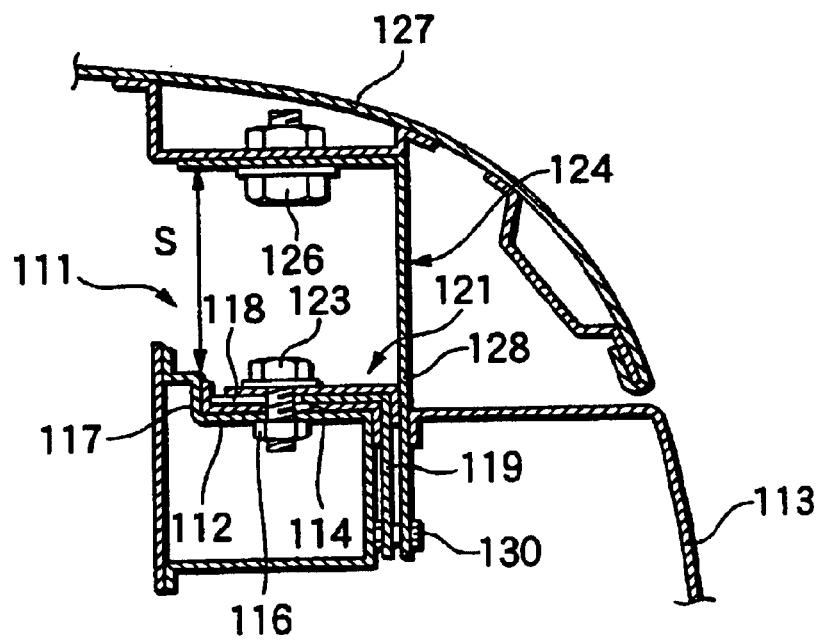

Now, FIGS. 7A–7C show a second embodiment of a vehicle body structure to which the above-mentioned hood hinge structure according to the invention are applied. Specifically, FIG. 7A is a perspective view of the main portions of the second embodiment after it is assembled. FIG. 7B is a section view taken along the arrow line E—E shown in FIG. 7A. FIG. 7C is an arrow view taken along the arrow mark D shown in FIG. 7A. In the vehicle body structure according to the second embodiment, similarly to the vehicle structure according to the first embodiment, on the engine room side which ranges from the strut tower of a frame upper 2 to a bulkhead 13, there is disposed a stepped portion 2A which is situated lower than the normal surface, or, the upper surface of the frame upper 2. A suspension upper bracket 14 forming the upper surface portion of the strut tower is formed lower than the normal surface of the vehicle body 2. Due to this structure, even in the case that a clearance between the suspension upper bracket 14 and the hood 1 cannot be increased, a sufficient shock-absorbing stroke can be secured.

Although description has been given heretofore of the respective embodiments according to the invention, in the case of the followings, other embodiments and other modifications can also be selected properly without departing from the scope of the appended claims of the invention. That is, the shape of the hinge lower including the shape of the fragile portion and the mode for fixing the hinge lower to the hood; the mode for hinge connecting together the hinge lower and hinge upper; the shape of the stepped portion (it may also be composed of several stepped portions); the shape of the shock-absorbing member including a fragile portion and the mode for fixing the shock-absorbing member to the vehicle body; the mode for forming the bending promoting shape in the hood; the shape of the frame upper constituting the vehicle body and the mode for connecting the frame upper to the frame side upper, strut tower, front bulkhead and front pillar; and, the shape and form of the strut tower including the structure associated with the suspension upper bracket and wheel apron lower.

As has been described heretofore in detail, according to the invention, in a hood hinge structure for connecting together a hinge lower fixed to a vehicle body and a hinge upper fixed to a hood by hinge means, the engine room side of the vehicle body served as a hinge lower fixing portion is formed as a stepped portion which is situated on the lower side. A hinge upper fixing portion is disposed such that it is opposed to the stepped portion. Thanks to this, even in the case that the head of a pedestrian is butted against the hood in the vicinity of the hinge portion due to a collision, the hinge portion is deformed within a relatively long shock-absorbing stroke formed between the hinge portion and stepped portion formed on the engine room side of the vehicle body to be able to absorb the shock sufficiently, which makes it possible to minimize damage to the pedestrian. Also, since the stepped portion is formed on the engine room side, the hinge portion can be dropped and deformed into the interior of the engine room, so that the shock-absorbing stroke can be expected to be further longer.

And, in the case that at least the outside of the hinge upper fixing portion of the hood side edge portion is formed in a bending promoting shape, the side edge portion of the hood can be made easy to deform along the shape of the pedestrian's head, so that the shock surface pressure can be lowered to thereby relieve the shock and, at the same time, the side edge portion of the deformed hood can be contacted with the upper end portions of the respective hinge surfaces of the hinge upper and hinge lower to thereby facilitate the occurrence of bending moment around the hinge axial center, which can promote the bending deformation of the hinge portion.

Further, in the case that, between the hinge upper fixing portion of the hood and the stepped portion of the vehicle body, there is interposed a shock-absorbing member with respect to a load applied from above, a good shock-absorbing characteristic provided by a large stroke due to the existence of the stepped portion can be controlled properly by the shock-absorbing member which is disposed in the stepped portion.

And, in case where the shock-absorbing member is formed integral with the hinge lower, the fixation of the hinge lower side to the vehicle body and the shock-absorbing function can be realized at the same time by a single member, thereby being able to reduce the number of parts as well as simplify the parts mounting operation.

Also, in case where there is formed a fragile portion between the hinge lower fixing portion of the vehicle body and the connecting portion of the hinge lower and the hinge upper, the hinge lower can be deformed while absorbing the shock effectively. Further, in case where the fragile portion is formed as a bent portion which can be bent formed on the engine room side, the vertical length of the hinge surface is decreased and the fixing bolt mounting operation space is increased to thereby be able to enhance the operation efficiency; and, the drop and deformation of the hinge portion into the interior of the engine room is promoted to thereby be able to contribute toward expanding the shock-absorbing stroke further.

And, according to the invention, in a vehicle body structure including a hood hinge for hinge connecting together a hinge lower to be fixed to a vehicle body and a hinge upper to be fixed to a hood, on the engine room side of the vehicle body ranging from a strut tower thereof to a bulkhead thereof, there is formed a stepped portion which is situated lower than the normal surface of the vehicle body, and a hinge upper fixing portion is disposed such that it is opposed to the stepped portion. Thanks to this structure, by a simple structure change that the stepped portion is disposed in part of the vehicle body structure, the shock can be absorbed effectively through the deformation of the hinge portion having a long shock-absorbing stroke.

Also, in case where the upper surface portion of the strut tower is formed lower than the normal surface of the vehicle body, even in a structure where a clearance between a suspension upper bracket and the hood cannot be widened, a sufficient shock-absorbing stroke can be secured.

Further, in case where overlapping flanges respectively to be overlapped with a front pillar and strut tower are disposed on and extended from the vehicle body forming the above-mentioned hinge lower fixing portion, vertical input loads from a suspension and a shock given from front due to the collision of the front portion of the vehicle body can be dispersed to the front pillar to enhance a collision shock-absorbing effect, thereby being able to absorb the collision shock sufficiently.

As described above, according to the invention, there can be provided a hood hinge and body structure which not only can secure a sufficient shock-absorbing stroke in the hinge portion while maintaining the low hood surface but also are enhanced in the parts mounting operation efficiency.

What is claimed is:

1. A hood hinge and body structure comprising:
   a vehicle body having a stepped portion that is located at a position lower than an upper surface of a frame upper of said body and at an engine room side;
   a hinge lower fixed to a hinge lower fixing portion of said upper surface that is located adjacent to said stepped portion; and
   a hinge upper fixed to a hinge upper fixing portion of a hood and pivotably connected to said hinge lower to form a hinge at a connecting position,
   wherein said hinge upper fixing portion is opposed to said stepped portion in a vertical direction of the vehicle body.

2. The hood hinge and body structure as set forth in claim 1, further comprising:
   a wave portion disposed on a side edge portion of said hood and at least in a vicinity of said hinge upper and being stretchable when an impact acts on said hood.

3. The hood hinge and body structure as set forth in claim 1, further comprising:
   a shock-absorbing member interposed between said hinge upper fixing portion and said stepped portion.

4. The hood hinge and body structure as set forth in claim 1, further comprising:
   a fragile portion formed on said hinge lower between said hinge lower fixing portion and said connecting position.

5. The hood hinge and body structure as set forth in claim 1, wherein said stepped portion is located between a strut tower of said vehicle body and a bulkhead of said vehicle body in a back-and-forth direction of said vehicle body.

6. The hood hinge and body structure as set forth in claim 2, further comprising:
   a shock-absorbing member interposed between said hinge upper fixing portion and said stepped portion.

7. The hood hinge and body structure as set forth in claim 2, further comprising:
   a fragile portion formed on said hinge lower between said hinge lower fixing portion and said connecting position.

8. The hood hinge and body structure as set forth in claim 3, further comprising:
   a fragile portion formed on said hinge lower between said hinge lower fixing portion and said connecting position.

9. The hood hinge and body structure as set forth in claim 3, wherein said shock-absorbing member is integrally formed with said hinge lower.

10. A hood hinge and body structure as set forth in claim 4, further comprising:
    a fragile portion formed on said hinge lower between said hinge lower fixing portion and said connecting position.

11. The hood hinge and body structure as set forth in claim 6, wherein said shock-absorbing member is integrally formed with said hinge lower.

12. The hood hinge and body structure as set forth in claim 5, wherein an upper surface portion of said strut tower is formed lower than said upper surface.

13. The hood hinge and body structure as set forth in claim 5, further comprising an overlapping flange overlapped with both of a front pillar of said body and said strut tower, and mounted on said body.

14. The hood hinge and body structure as set forth in claim 9, further comprising:
    a fragile portion formed on said hinge lower between said hinge lower fixing portion and said connecting position.

15. The hood hinge and body structure as set forth in claim 11, further comprising:
    a fragile portion formed on said hinge lower between said hinge lower fixing portion and said connecting position.

16. The hood hinge and body structure as set forth in claim 12, further comprising an overlapping flange overlapped with both of a front pillar of said body and said strut tower, and mounted on said body.

17. A hood hinge and body structure comprising:
    a body having an upper surface and a stepped portion lower than said upper surface;

a hinge lower fixed to said upper surface; and a hinge upper fixed to a hood and pivotably connected to said hinge lower, wherein said hinge upper opposes said stepped portion.

18. The hood hinge and body structure of claim 17, wherein said hinge lower is fixed to said upper surface adjacent to said stepped portion.

19. The hood hinge and body structure of claim 17, further comprising a shock absorbing member for absorbing a shock between said hinge upper and said stepped portion.

20. A hood hinge and body structure comprising:

a body having a hinge lower fixing portion of a frame upper and a stepped portion lower than said hinge lower fixing portion;

a hinge lower fixed to said hinge lower fixing portion; and a hinge upper fixed to a hood and pivotably connected to said hinge lower, wherein said hinge lower is fixed to said hinge lower fixing portion adjacent to said stepped portion.

* * * * *